Figures 1, 3:
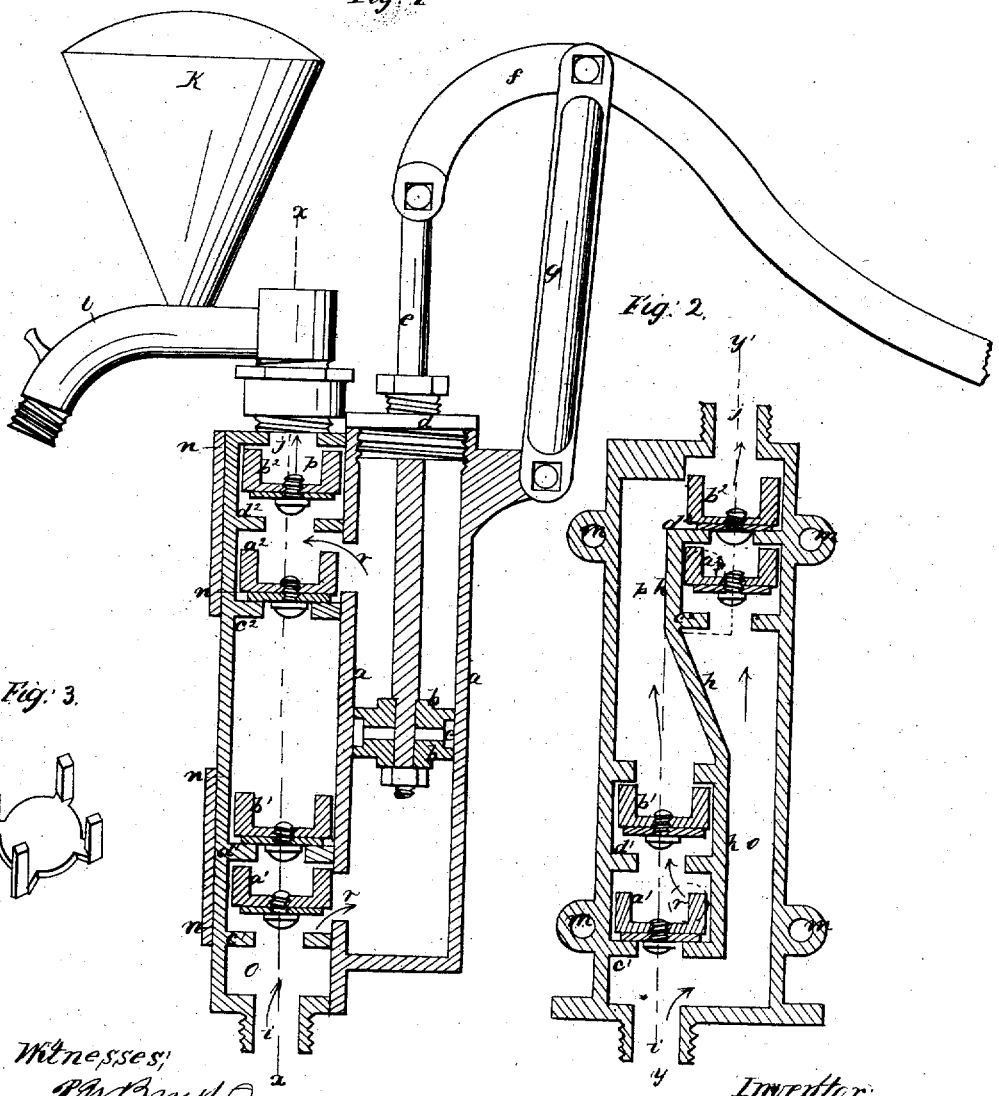

UNITED STATES PATENT OFFICE.

WILLIAM D. HOOKER, OF SAN FRANCISCO, CALIFORNIA.

IMPROVEMENT IN PUMPS.

Specification forming part of Letters Patent No. 49,408, dated August 15, 1865; Reissue No. 2,343, dated August 28, 1866.

*To all whom it may concern:*

Be it known that I, WILLIAM D. HOOKER, of the city and county of San Francisco, State of California, have invented a new and useful Improvement in Double-Acting Suction and Force Pumps for Raising and Forcing Water or other Liquids; and I do hereby declare that the following is a full, clear, and exact description of the construction and operation of the same, reference being had to the annexed drawings, making a part of this specification, in which—

Figure 1 is a longitudinal section, showing the arrangement of the valves, suction and discharge chambers *y y*. Fig. 2 is also a longitudinal section, *x x* showing the line of section. Fig. 3 is a perspective view of valve.

Similar letters of reference indicate corresponding parts in the three figures.

The nature of my invention consists in separating the suction and discharge chambers and suction and discharge valves by a partition, said partition forming a chamber in which the valves operate, and from which they can be readily removed, the chamber also acting as a guide to keep the valve in position, as will be hereinafter more fully shown and described.

To enable others skilled in the art to fully understand and construct my machine, I will proceed to describe it.

*a* represents the pump-barrel, constructed of metal, and of cylindrical form; *b b*, the pump-piston; *c*, the packing, made of metal, india-rubber, or any material commonly used for such purpose; *d*, the pump-barrel head; *e*, the piston-rod; *f*, the handle; *g*, the arm on which the handle rotates; *h*, the vertical and inclined partition separating the suction-chamber and suction-valves from the discharge-chamber and discharge-valves; $a'$ and $a^2$, the suction-valves; $b'$ and $b^2$, the discharge-valves, said valves being made of metal and fitted to the valve-seats, or covered with leather or india-rubber or any substance usually used for such purpose, said covering being secured to the valves by means of a screw and washer, as shown; $c'$ and $c^2$, the suction-valve seats; $d'$ and $d^2$, the discharge-valve seats; *i*, the induction-port; *j*, the eduction-port; *k*, the air-chambers; *l*, discharge-spout; *m m m m*, apertures through which the bolts or screws are inserted to secure the chamber to pump-cylinder, or where the chamber is cast with the cylinder. I leave an aperture or opening (indicated by dotted lines *n n n n*) opposite the valves, through which the valves can be readily removed, said aperture *n* being covered by a cap or plate, and secured to the chamber in the same manner as the chamber described is secured to the pump-cylinder; *o*, the suction-chamber; *p*, the discharge-chamber; *r*, the ports in pump-barrel.

As the piston *b* is drawn up the pump-barrel *a* the vacuum created thereby causes the suction-valve $a'$ to open, and the water is drawn into the cylinder through the induction-port *i*. When the piston *b* descends the suction-valve $b'$ is opened and the water is forced out into the discharge-chamber *p* and out spout *l* at the same time that the piston is descending. The vacuum created above the piston thereby causes the suction-valve $a^2$ to open, and the water is drawn up the suction-chamber *o* and through or under the suction-valve $a^2$ into the cylinder, to be forced out the discharge-valve $b^2$ into the discharge-chamber *p*, and out at the spout *l* on the return or next upward stroke of the piston *b*, thereby causing a continuous stream to flow from the discharge-spout *l*.

The vertical and inclined partition *h* is so arranged as to divide the suction-chamber *o* from the discharge-chamber *p*, and is connected or cast to the valve-seats $c'$ and $c^2$, $d'$ and $d^2$, in such a manner as to form a chamber in which the valves lie entirely independent of the chamber, said chamber acting as a guide to the valves in their upward and downward movements, (see Fig. 2,) and also preventing them from turning.

What I claim as my improvement, and desire to secure by Letters Patent, is—

The vertical and inclined partition *h*, in combination with the suction-valve seats $c'$ and $c^2$, and discharge-valve seats $d'$ and $d^2$, and the valves $a'$ $a^2$ $b'$ $b^2$, the whole arranged as described, and for the purpose specified.

In witness whereof I have hereunto set my hand and seal.

WILLIAM D. HOOKER. [L. S.]

Witnesses:

C. W. M. SMITH,

GEO. H. STRONG.

W. D. Hooker,

Double-Acting Pump.

No. 2,343. Reissued Aug. 28, 1866.

Witnesses:
R. W. Bush
A. N. Hansen

Inventor:
William D. Hooker

N. PETERS, PHOTO-LITHOGRAPHER, WASHINGTON, D. C.